May 2, 1967 W. C. SCHMITT 3,316,932
WATER MIXING DEVICE FOR WATER CLOSET STORAGE TANKS
Filed Dec. 2, 1964
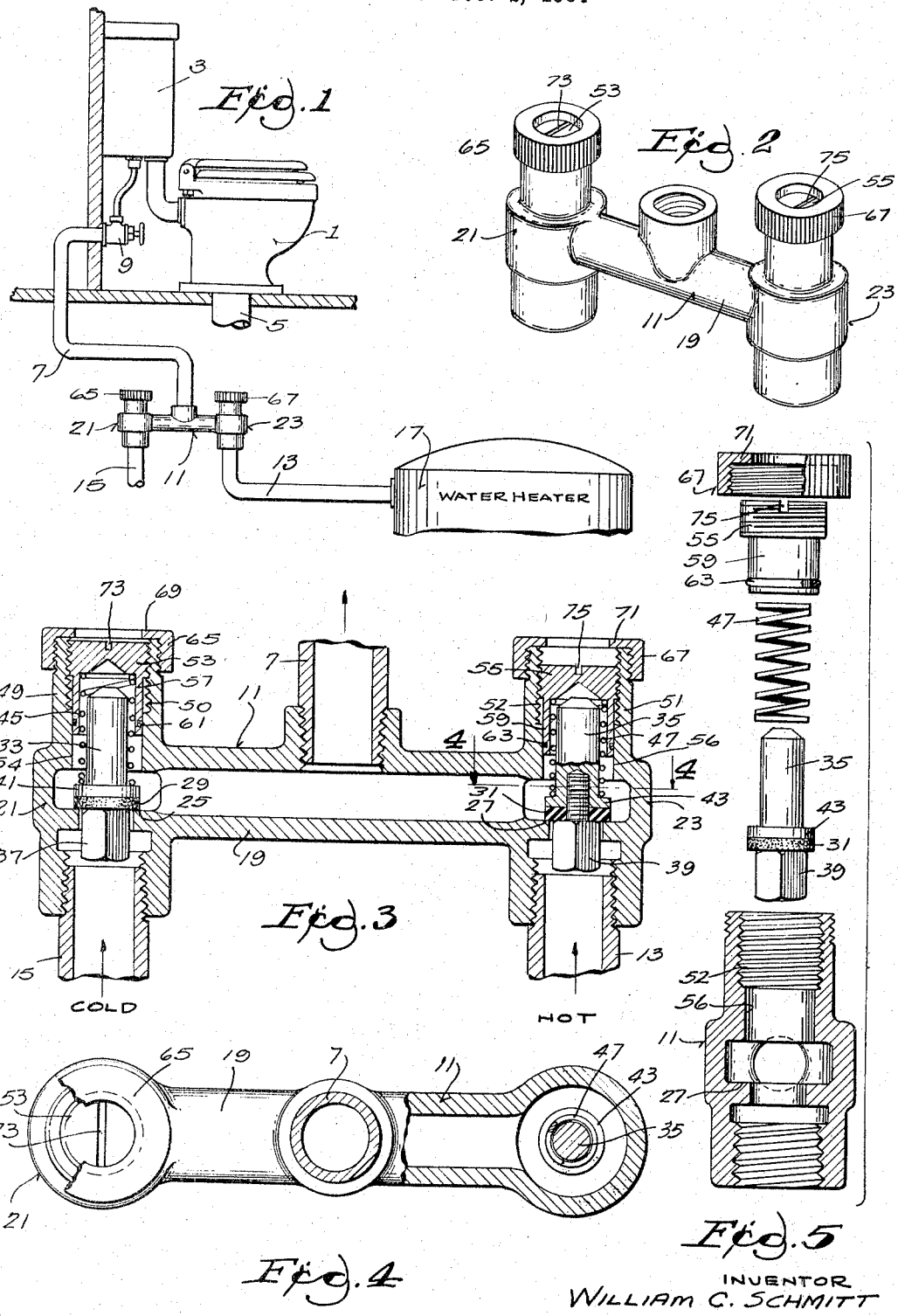
INVENTOR
WILLIAM C. SCHMITT
BY:
Lieber & Niller
ATTORNEYS

United States Patent Office 3,316,932
Patented May 2, 1967

3,316,932
WATER MIXING DEVICE FOR WATER CLOSET STORAGE TANKS
William C. Schmitt, Milwaukee, Wis., assignor to Milwaukee Faucets, Inc., Milwaukee, Wis., a corporation of Wisconsin
Filed Dec. 2, 1964, Ser. No. 415,403
2 Claims. (Cl. 137—512)

This invention relates to a means for preventing condensation on water closet storage tanks during warm or humid weather. Such storage tanks are employed in an elevated position for flushing the water closet. Generally, the tank is refilled after flushing with water from an available cold water supply pipe. During warm or humid weather, or even during extended periods of showering or bathing, the cold water in the tank causes the moisture contained in the warm air to condense on the exterior walls of the tank. This so-called "sweat" on the tank walls subsequently drips on the floor or adjacent building walls resulting in water damage thereto.

Several means have been proposed to deal with this problem. An absorbent covering for the tank has been employed to prevent moisture from dripping on the floor. Such coverings, however, become saturated after a short interval and require drying out for continued effectiveness. Pans or trays under the tank have also been tried but these are difficult to install and troublesome to empty.

It has also been proposed to provide warm water to the tank during warm or humid weather to prevent the condensation from originating and the present invention is directed to a means for providing such water to the water storage tank.

Several devices for providing warm water exist in the prior art. In the U.S. patent to Rom, No. 2,900,645, a mixing device is shown having a cold water inlet, a hot water inlet, and a single outlet to the water storage tank. The proportion of hot and cold water supplied thereto is determined by spring biased valves which control the volume of hot and cold water through the mixing device during the filling of the water storage tank.

Devices of the type shown in the aforementioned patent have suffered from numerous deficiencies. During winter months, warm water is not required in the water storage tank and for economy it is desirable to shut off the hot water supply. This may be done by an electric control circuit connected to the mixing device which measures the ambient temperature and shuts the hot water supply off during periods of low temperature.

The hot water valve in the mixing device may also be mechanically adjusted to shut off the flow of hot water during such periods. Because of the complicated nature and expense of the former, and because of the positive control provided by shutting off the hot water valve in the mixing device the latter is often preferred.

In the past, mechanical adjustment of the valves to control the water temperature has been a difficult procedure. The home owner has needed a wrench to remove protective caps to gain access to the adjusting mechanism. Rust and corrosion of the adjusting parts from the water in the device during the long intervals between adjustments often make adjustments impossible once access is gained.

It is therefore, an object of this invention to provide a mixing device which is simple and easy to adjust to provide either variable degrees of warm water or cold water at the outlet thereof.

A further object of this invention is to provide a mixing device which requires only a screw driver to adjust the valves thereof.

Yet another object of this invention is to provide a mixing device, having adjustable valves, the adjusting mechanism of which are not exposed to water in the device and hence are not subject to rust or corrosion therefrom.

The above and other objects of the invention are obtained by providing a mixing device in the form of an elongated chamber having a hot water inlet at one end and a cold water inlet at the other end. The outlet of the mixing device is located in the central portion of the chamber. The chamber has partially threaded bores opposite each of the water inlets. A valve is located in each of the inlets having a valve seat formed by the walls of the chamber. A valve disc, when resting on the valve seat, blocks the flow of water in the inlet. The valve disc is mounted on a valve stem having a surrounding compression spring. The valve stem extends into the bore opposite the water inlet. A plug is mounted in the threaded portion of the bore and contains the other end of the valve stem and the compression spring. The plug may be adjusted along the threads to provide a greater or lesser compression to the spring and hence control the lifting of the valve disc off the valve seat in response to the inlet pressure of the water. The plug also contains an elongated skirt having a sealing means coacting with the non-threaded portion of the bore which prevents water in the mixing device from reaching the threaded portion of the bore. A cap mounted on the outside of the bore and having an overhanging lip protects the threaded portion of the bore from dust and dirt while allowing access to the plug to adjust the operation of the valve.

The invention, together with the above and further objects, may be better understood by reference to the attached specification and drawing, forming a part thereof, in which:

FIGURE 1 is a schematic view showing a water closet installation embodying the present invention;
FIGURE 2 is a perspective view of the mixing device of the present invention;
FIGURE 3 is a cross sectional view of the mixing device;
FIGURE 4 is a partially sectionalized top view of the mixing device, the sectionalized portion being taken along line 4—4 of FIGURE 3;
FIGURE 5 is an exploded view of the valve mechanism of the present mixing device.

Referring now to FIGURE 1, the numeral 1 indicates a water closet of the conventional type having an elevated water storage tank 3 for flushing the contents of water closet 1 through discharge pipe 5. Water storage tank 3 is supplied with water by pipe 7 through shut off valve 9. Mixing device 11 is connected to pipe 7 and provides that pipe with hot water from inlet pipe 13 and cold water from inlet pipe 15. Hot water inlet pipe 13 may be connected to water heater 17 which may be a conventional domestic water heater of the automatically controlled type. Water heaters of this type are usually set to supply hot water at a temperature of approximately 160 degrees F. Cold water supply pipe 15 may be connected to any available cold water source.

The details of mixing device 11 may be better understood by reference to FIGURES 3 through 5. The mixing device includes an elongated chamber 19, at either extremity of which is a valve mechanism. Valve mechanism 21 is mounted in the cold water inlet connected to pipe 15 while valve 23 is mounted in the hot water inlet connected to pipe 13. The outlet from chamber 19 to pipe 7 is centrally located in the chamber.

Valves 21 and 23 consist of valve seats 25 and 27 formed by the walls of chamber 19 upon which rest valve discs 29 and 31. The valve discs serve to block inlet pipes 15 and 13 when resting on valve seats 25 and 27. Valve discs 29 and 31 are attached to valve stems 33 and 35 by bolts 37 and 39. Valve stems 33 and 35 contain flanges 41 and 43 which provide support for valve discs 29 and 31 as well as providing a stop for compression springs 45 and 47. Compression springs 45 and 47 seat valve discs 29 and 31 on valve seats 25 and 27.

Opposite valve seats 25 and 27 are partially threaded bores 49 and 51. These bores extend away from valve seats 25 and 27 and are threaded at their outer end only. Mounted on these threaded portions 50 and 52 are plugs 53 and 55. These plugs form the stops for compression springs 45 and 47 and provide for adjusting the compression of springs 45 and 47 by changing the position of the plugs on the threaded portions 50 and 52 of bores 49 and 51. Each of the plugs has an extended skirt portion 57 and 59 extending towards the respective valve seat and surrounding valve stems 33 and 35 and compression springs 45 and 47. The skirt portions contain a sealing means 61 and 63, which may be an O-ring seal as shown in FIGURES 3 and 5, providing a water tight seal with the smooth or unthreaded portion 54 and 56 of bores 53 and 55.

Caps 65 and 67 are provided on the outer end of bores 49 and 51. These caps have overhanging lips 69 and 71 which provide further protection to the threaded portions 50 and 52 of bores by preventing dust and dirt from falling directly thereon. The opening formed by overhanging lips 69 and 71 permit access to plugs 53 and 55. Plugs 53 and 55 are provided with slots 73 and 75, adapted to fit a screw driver to permit the position of plugs 53 and 55 to be changed by rotation along the threaded portions 50 and 52 of bores 49 and 51.

When water storage tank 3 is filled, valves 21 and 23 are closed by valve discs 29 and 31 seating on valve seats 25 and 27 as the combined pressure of the hydrostatic head between water storage tank 3 and mixing device 11 and the pressure of springs 45 and 47 exceeds the inlet pressures in the cold water supply pipe 15 and hot water supply pipe 13. When water closet 1 is flushed, draining water storage tank 3, the inlet pressures in supply pipes 15 and 13 exceed the pressure on valve discs 29 and 31 provided by compression springs 45 and 47 and valves 21 and 23 open to admit water to the mixing device. The degree to which valves 21 and 23 open is dependent upon the pressure placed on valve discs 29 and 31 by springs 45 and 47. The compression of springs 45 and 47 is, in turn, determined by the position of plugs 53 and 55 on the threaded portions 50 and 52 of bores 49 and 51. Generally, less hot water is required than cold water and, as shown in FIGURE 3, plug 55 of valve 23 is adjusted to provide a greater degree of pressure on valve seat 31 than is provided to valve disc 29. This is accomplished by lowering the position of valve plug 55 on the threaded portion 52 of bore 51. Valve 23 therefor opens to a lesser extent than valve 21 and less than hot water than cold water is supplied to storage tank 3.

To adjust the position of plugs 53 and 55 along the threaded portion of bores 49 and 51 it is necessary only to insert a screw driver in slots 73 and 75 and rotate the plug to the desired position. During the water months when it is unnecessary to provide warm water to storage tank 3, hot water valve 23 may be shut off by lowering plug 55 onto valve stem 35. This positively seals valve 23 and prevents unnecessary usage of hot water. It is to be noted that whether the plugs are in the raised position, such as plug 53 of valve 21, or a lowered position, such as plug 55 of valve 23, sealing means 61 and 63 prevent water from reaching the threaded portions 50 and 52 of bores 49 and 51. This eliminates rust or corrosion of the adjusting mechanisms of valves 21 and 23 regardless of the operating positions. It may also be noted that caps 65 and 67 protect the adjusting parts of the valves yet do not require removal or the use of tools to expose the adjusting mechanism of the valves. In addition, the overhanging lip of each cap insures against inadvertent displacement of the respective threaded plugs 53 and 55 and limits the outward movement thereof.

In the drawings and specification, there has been set forth a preferred embodiment of the invention, and although specific terms are employed, they are used in a generic and descriptive sense only and not for purposes of limitation. Changes in form, as well as the substitution of equivalents are contemplated, as circumstances may suggest or render expedient, without departing from the spirit or scope of this invention as further defined in the following claims.

I claim:
1. A mixing device for hot and cold water comprising:
   an elongated chamber housing a hot water inlet at one end and a cold water inlet at the other end and an outlet in the central portion thereof, said chamber having bores opposite said inlets, said bores containing a threaded portion at the outer end thereof and a smooth non-threaded portion adjacent said chamber;
      a valve in each of the hot and cold water inlets comprising:
      a valve seat formed by the wall of the chamber adjacent said inlet;
      a valve stem having a valve disc at one end thereof resting on said valve seat to block said inlet;
      a spring means surrounding said valve stem;
      a plug fitting over the other end of said valve stem and containing said spring to force the valve disc on said valve seat, said plug threaded to mate with the threaded portion of said bore for movement toward or away from said valve seat, said plug having a skirt extending toward said valve disc containing a sealing means contacting said bore on the smooth non-threaded portion; and
   a tubular cap having an overhanging lip mounted on the outside of said bore to protect the threaded portion thereof while permitting access to said plug;
   whereby the mixture of hot and cold water supplied to the outlet is determined by the force exerted on said valve discs by said springs.
2. The mixing device of claim 1 wherein said sealing means comprises an O-ring seal residing in a groove in said skirt.

References Cited by the Examiner
UNITED STATES PATENTS

| | | | |
|---|---|---|---|
| 1,202,263 | 10/1916 | Bills | 137—512 |
| 2,900,645 | 8/1959 | Rom | 4—18 |
| 3,234,959 | 2/1966 | Feinberg | 137—606 X |

STANLEY N. GILREATH, *Primary Examiner.*